US 9,250,774 B2

(12) United States Patent
Aghadavoodi Jolfaei (10) Patent No.: US 9,250,774 B2
(45) Date of Patent: Feb. 2, 2016

(54) USER INTERFACE PUSH CHANNEL

(71) Applicant: Masoud Aghadavoodi Jolfaei, Walldorf (DE)

(72) Inventor: Masoud Aghadavoodi Jolfaei, Walldorf (DE)

(73) Assignee: SAP SE, Walldorf (DE)

( * ) Notice: Subject to any disclaimer, the term of this patent is extended or adjusted under 35 U.S.C. 154(b) by 196 days.

(21) Appl. No.: 14/061,012

(22) Filed: Oct. 23, 2013

(65) Prior Publication Data

US 2015/0113442 A1  Apr. 23, 2015

(51) Int. Cl.
*G06F 3/0484* (2013.01)
*H04L 29/08* (2006.01)

(52) U.S. Cl.
CPC .............. *G06F 3/0484* (2013.01); *H04L 67/26* (2013.01)

(58) Field of Classification Search
CPC ................................ G06F 3/048; H04L 29/06
See application file for complete search history.

(56) References Cited

U.S. PATENT DOCUMENTS

| 2010/0332665 | A1* | 12/2010 | Jolfaei | 709/228 |
| 2011/0264753 | A1* | 10/2011 | Park et al. | 709/206 |
| 2012/0023077 | A1* | 1/2012 | Kann et al. | 707/702 |
| 2012/0157055 | A1* | 6/2012 | Ren et al. | 455/411 |
| 2014/0379779 | A1* | 12/2014 | Ewe | 709/203 |

* cited by examiner

*Primary Examiner* — William Bashore
*Assistant Examiner* — Jeanette J Parker
(74) *Attorney, Agent, or Firm* — Fountainhead Law Group PC (57) ABSTRACT

Systems and methods for establishing UI push channels are disclosed. The UI push channels can be used to broadcast event notifications to multiple UIs whenever the information in an underlying data source is changed. In response to the event notifications, the UIs may update or refresh the displayed information so as to include the most current information in the data source. UI push channels are defined by associations between an application messaging channel (AMC) and the UI connection used to communicate with the client computing device and the application server. In particular, the UI push channels can be established by an AMC definition that defines a target data source, subscriber entities, and publisher entities. The listing of the publishers and the subscribers in the AMC definition infer the associations between the corresponding AMC and the UI connections.

17 Claims, 9 Drawing Sheets

USER INTERFACE PUSH CHANNEL

BACKGROUND

Unless otherwise indicated herein, the approaches described in this section are not prior art to the claims in this application and are not admitted to be prior art by inclusion in this section.

Client-server system configurations provide for centralized data management and storage (e.g., databases, tables, etc.). Typically, centralized data management and storage systems are implemented on a server computer or in a cloud computing environment that can communicate over one or more proprietary or open networks. Client computing devices (e.g., desktop computers, laptop computers, tablet computers, etc.) executing a client application specifically designed to communicate with the centralized data management and storage system can securely connect to the system over the networks.

In general, the purpose of the client application is to provide users with access (e.g., read, write, update, etc.) to data stored in a remote system (e.g., a business system). For example, a user, through the client application, might request that the information in a particular data table in the centralized data management and storage system be displayed in a UI on his client computing device. Information from the particular table may be displayed to the user in a particular graphical user interface (GUI). To handle the user input received from the user, render the GUI, and populate the GUI with the information from the table, some systems implement a UI agent-UI session configuration. In such configurations, the UI agent is instantiated on the client computing device and communicates with a corresponding UI session instantiated in remote application server with access to the centralized data management and storage system. The UI session handles requests from the UI agent for information or analysis of information in a data source, and in response, executes corresponding transactions on the data stores. The UI session may then send the resulting information back the UI agent to be displayed in the UI.

Because of the request-response nature of communication between the UI agent and the UI session, the information displayed in the corresponding GUI is only valid as long as the underlying data in the data source is unchanged. Because the data table may be available to a number of client computing devices simultaneously, it is possible that the data in the data source may be changed, updated, or deleted after the transaction for information was completed and the information is displayed. In particular, the information displayed in a GUI may no longer accurately represent the data if another UI session, or other application, has performed altering transactions (e.g., write, update, or replace functions) on the data source since the information was obtained. To ensure that the information displayed in the GUI includes the most timely data from the underlying data table, is often necessary to manually or periodically re-execute or update the transaction in order to obtain the most current data from the data table. Manually or periodically re-executing or updating the transaction can cause undesirable overuse of the available computing and network resources at all levels. The overuse of computing and network resources not only diminishes the performance of the centralized data management and storage system, but also decreases the user experience in the form of lag and delays.

SUMMARY

The present invention relates to systems and methods for accessing information stored in a central data source, and in particular, to systems and methods for a user interface (UI) push channel for sending event notifications to one or more UIs that may trigger automatic updates of the displayed information when another UI or application initiates changes to the information in the central data source.

Embodiments of the present invention improve UIs for accessing information in centralized data management and storage systems by establishing UI push channels through which notifications of changes to the data can be sent to trigger updates to information displayed. In one embodiment the present invention is directed toward a method that includes instantiating a first user interface (UI) session in communication with a corresponding first UI agent instantiated in a first client computing device through a first UI connection. The first UI session handles transactions for information from a data source for the first UI agent, and wherein the first UI agent displays a first UI comprising the information from the data source on the client computing device. The method may also include associating the first UI connection with an application messaging channel (AMC), the AMC comprising an interface for communicating between the first UI session and a plurality of other UI sessions instantiated in the computer system, receiving on the AMC a notification of an event in the data source from one of the other UI sessions, and sending the notification of the event to the first UI agent through the first UI connection.

In one embodiment, the method may also include receiving, through the first UI session, an update request from the first UI agent for updated information in response to the notification of the event, and processing, by the first UI session, the update request to generate the updated information from the data source, and sending, by the first UI session, the updated information to first UI agent.

In one embodiment, associating the first UI connection with the AMC includes storing a UI connection identifier for the UI connection and an AMC identifier for the AMC in an AMC registry, wherein the AMC registry comprises a plurality of AMC definitions, wherein each of the plurality of AMC definitions comprises an AMC identifier associated with at least one UI connection identifier or a corresponding UI agent identifier.

In one embodiment, sending the notification of the event includes referencing the AMC definition in the AMC registry associated with the AMC identifier of the AMC on which the notification of the event was received to determine one or more subscriber UI connections or one or more subscriber UI agents to which the notification of the event is to be published.

In one embodiment, sending the notification of the event to each of the subscriber UI connections or subscriber UI agents.

In one embodiment, the AMC includes an advanced business programming (ABAP) messaging channel.

In one embodiment, the method the first UI agent includes an SAP graphical user interface (GUI), wherein the first UI session comprises an SAP GUI session, and wherein the UI connection comprises an SAP GUI connection, and wherein the notification of the event comprises an SAP dynamic information and action gateway (DIAG) protocol message.

Another embodiment of the present disclosure includes a non-transitory computer readable medium instructions stored thereon, that when executed by a computer processor cause the computer processor to be configured for instantiating a first user interface (UI) session in communication with a corresponding first UI agent instantiated in a first client computing device through a first UI connection. The first UI session handles transactions for information from a data source for the first UI agent, and the first UI agent displays a first UI comprising the information from the data source on the client computing device. The instructions may further cause the computer processor to be configured for associating the first UI connection with an application messaging channel (AMC), the AMC includes an interface for communicating between the first UI session and a plurality of other UI sessions instantiated in the computer system, receiving on the AMC a notification of an event in the data source from one of the other UI sessions, and sending the notification of the event to the first UI agent through the first UI connection.

Yet another embodiment of the present inventions includes a system having a computer processor and a non-transitory computer readable medium coupled to the computer processor. In such embodiments, non-transitory computer readable medium includes instructions that when executed by the computer processor causes the computer processor to be configured to: instantiate a first user interface (UI) session in communication with a corresponding first UI agent instantiated in a first client computing device through a first UI connection, wherein the first UI session handles transactions for information from a data source for the first UI agent, and wherein the first UI agent displays a first UI comprising the information from the data source on the client computing device; associate the first UI connection with an application messaging channel (AMC), the AMC comprising an interface for communicating between the first UI session and a plurality of other UI sessions instantiated in the computer system; receive on the AMC a notification of an event in the data source from one of the other UI sessions; and send the notification of the event to the first UI agent through the first UI connection.

The following detailed description and accompanying drawings provide a better understanding of the nature and advantages of the present invention.

DETAILED DESCRIPTION

Described herein are techniques for UI push channels. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

OVERVIEW

Various embodiments of the present disclosure include systems and methods for establishing UI push channels. Such embodiments may include pushing notifications of changes to underlying data sources through the UI push channels to user interfaces (UIs) that are currently displaying information from those data sources. In response to the pushed notifications, the client and/or server based components can initiate and execute appropriate transactions to update the information displayed in the UIs.

One example embodiment includes a client-server implementation of a centralized data management and storage system. In such embodiments, a number of client computing devices are in communication with a central computer system (e.g., enterprise resource planning or customer relationship management systems). The central computer system, also referred herein as a business system, may be implemented in a centralized server computer or a distributed cloud computing environment. To access information stored on a business system, a client computing device may instantiate a UI agent that is in communication with a corresponding UI session instantiated in the business system (e.g., in an application server) through a corresponding UI connection. The UI agent handles receiving requests from users for information (e.g., requests to read, write, edit, display, or otherwise manipulate) from a particular data source (e.g., a centralized database or table), sending the appropriate transaction requests to the UI session, and displaying the resulting information in a corresponding UI on the client computing device. The UI session handles the execution of the transactions on the data source requested by the UI agent and, in response, sends the resulting information back to the UI agent. The UI connection may include an electronic communication link dedicated to sending/receiving requests/information between the UI agent and the UI session.

For example, the UI agent may send a request to the UI session through the UI connection to execute an "aggregation" transaction on a particular accounting database to obtain various aggregates of invoice amounts stored in the database for the current month. The UI session may then execute the aggregation transaction on the accounting database and return the resulting aggregated invoice amounts to the corresponding UI agent through the corresponding UI connection. The UI agent may then display the aggregated invoice amounts in a corresponding graphical user interface (GUI).

To establish a UI push channel, the UI agent, the UI connection, or the UI session used to handle a transaction can be bound to or "subscribe" to a particular application messaging channel (AMC) associated with the data source and/or a publisher UI agent, UI session, or UI connection that initiate or execute transactions on the data source. Accordingly, whenever another entity (e.g., a publisher UI session or application instantiated in the business system) executes a transaction on the data source, an event notification can be broadcast to any and all subscribers through the associated AMC. The pathways through the associated AMC and UI connections to the subscribers are referred to herein as UI push channels. Based on the event notification received through the UI push channel, the subscribers of particular AMC may update the information displayed in the corresponding UI.

In one embodiment, broadcasting the event notification of either a potential or actual change through the appropriate UI push channel includes forwarding the event notification to the corresponding subscriber UI agent. In such embodiments, the UI agent may determine if the notification involves a change to the data source that requires actions performed by the UI agent or the UI session. For most changes to the underlying data source, the UI agent will send an update or a refresh request to the corresponding UI session. In response to the update or refresh request, the UI session will re-execute the transaction that produced the information displayed in the GUI. Such embodiments eliminate the need for a refresh button to be included in the GUI by ensuring that the information displayed in the GUI is always current.

Because each refresh request requires the UI agent to generate and send a request to the UI session, and for the UI session to re-execute the transaction and send the results back to the UI agent, unnecessary refresh requests (i.e., refresh requests that occur before the underlying data source is altered) can result in undesirable consumption of computing and network resources. By eliminating the need for unnecessary refresh requests, various embodiments of the present disclosure can improve the performance of centralized data management and storage systems, while also improving the efficacy of the UI by providing the most current data and improving the end-user experience by reducing the amount of lag in the system observed by users.

UI for Accessing Centralized Data Storage and Management Systems

To illustrate the advantages of the embodiments described above and other features of the present disclosure, some example systems that may be improved by the present disclosure will now be discussed in detail.

Figure 1:
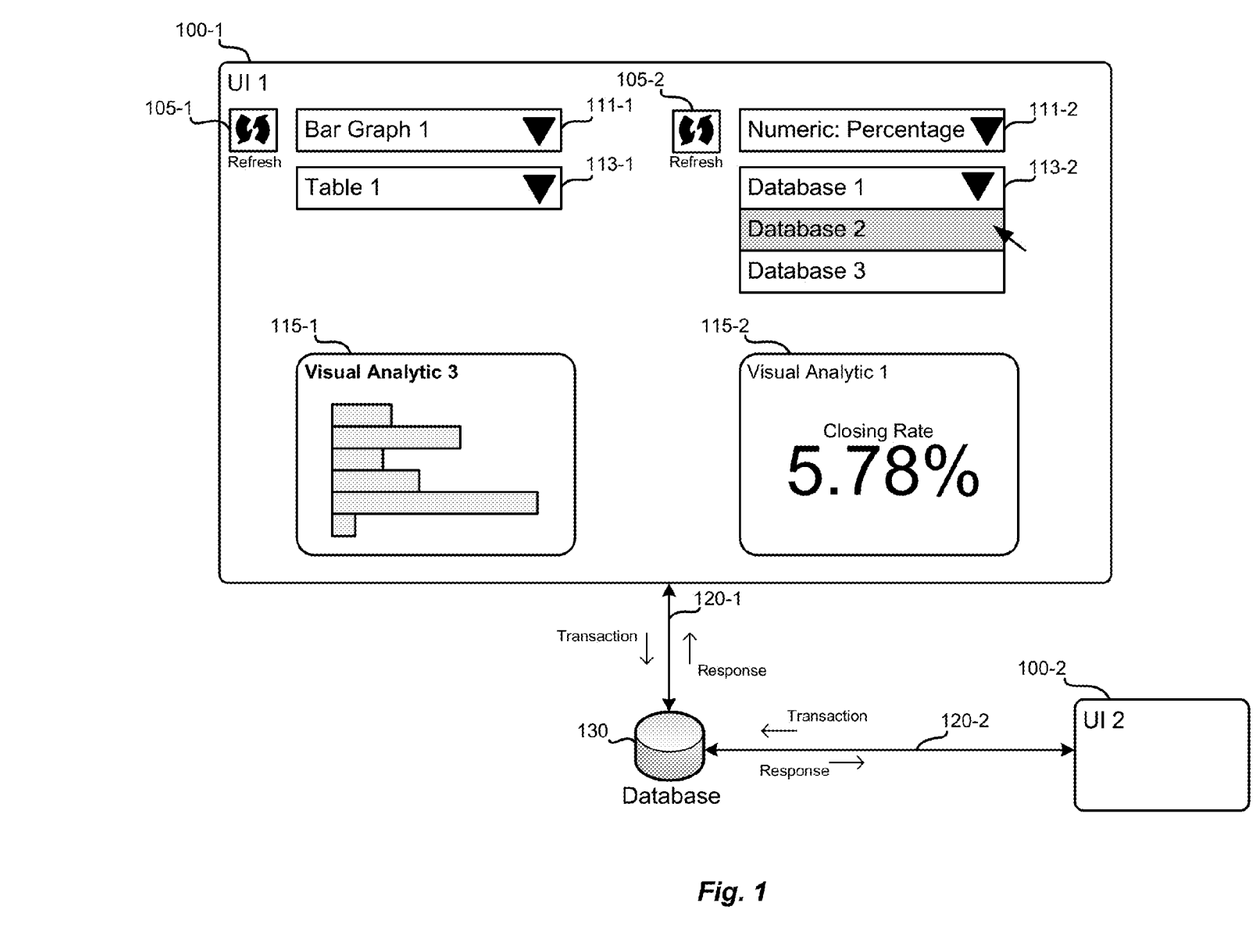
FIG. 1 illustrates a UI for displaying information from a central data source that may be improved by embodiments of the present disclosure.

FIG. 1 illustrates an example UI 100-1 that may be improved by various embodiments of the present disclosure. As shown, the UI 100-1 may include a number of fields and controls 111 and 113 and visual analytics 115 for displaying information retrieved from a database 130. To populate the fields and controls 111 and 113 and the visual analytics 115, the UI 100-1 may send a transaction to operate on a database 130 through the UI connection 120. The transaction can include transactions that read, update, or change information in this database 130. In response to the transaction, the UI 100-1 may receive a response that includes the requested or necessary information from the database 130 for populating the various fields and controls 111 and 113 and visual analytics 115. Typically, once the fields and controls 111 and 113 and the visual analytics 115 are populated with information from the database 130, the display of information does not change for as long as the UI 100-1 is displayed.

Meanwhile, another UI 100-2, as well as other applications, may also request/send transactions that operate on the database 130. Just as the UI 100-1 may send transactions to the database 130 that read, update, or change information in the database 130, so can UI 100-2 and the other applications. Accordingly, after the UI 100-1 is populated with the information resulting from the requested transaction, the information in the underlying database 130 may change. As such, any information statically displayed in the UI 100-1 may not be the most current information stored in database 130 due to subsequent transactions of other UIs and applications.

To assist users to view the most current information from database 130, some UIs 100-1 may include a refresh button 105. When the refresh button 105 is operated by a user, the UI 100-1 may resend the transaction to be operated on the database 130 to generate and respond with the necessary information to repopulate the controls and fields 111 and 113 and visual analytics 115 with the most current information. Alternatively, the UI 100-1 may be configured to periodically refresh the information at predetermined intervals. The information from a manual or periodic refresh may or may not be different from the information obtained by the original execution of the transaction. As such, there is significant potential for unnecessary refreshes.

Systems for Accessing Information in Centralized Data systems

Figure 2:
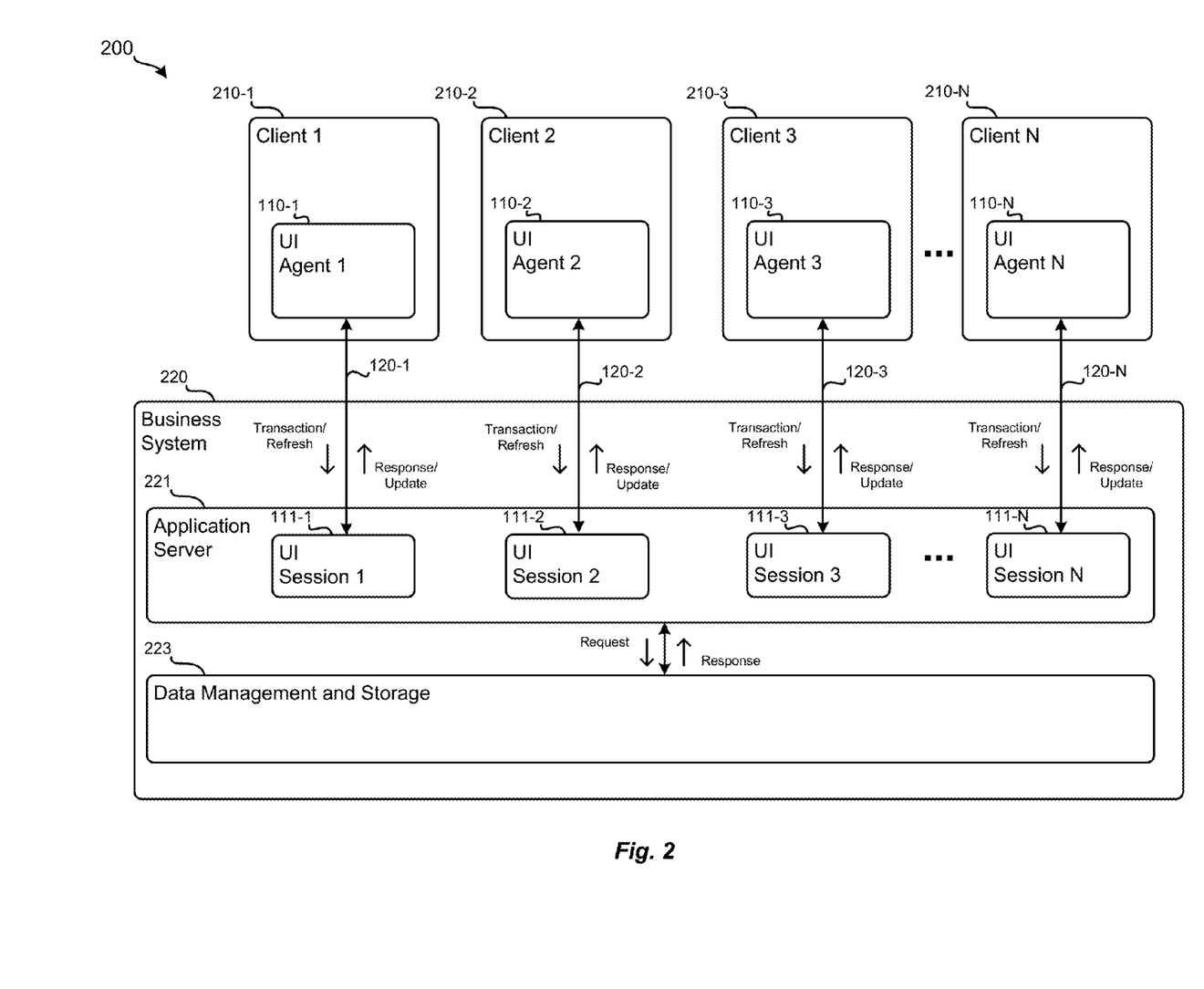
FIG. 2 illustrates a system for displaying information from a central data source that may be improved by embodiments of the present disclosure.

FIG. 2 illustrates a system 200 for accessing information in a centralized data management and storage system 223 in which various embodiments of the present disclosure may be implemented. As shown, the system 200 may include a number of the client computing devices 210 and a business system 220. In one example embodiment discussed in more detail herein, the business system 220 may be in communication with the client computing devices 210 through one or more electronic communication protocols or media. The business system 220 may include or be in communication with a data management and storage system 223 using various electronic communication media and protocols.

In one specific example, the business system 220 may include any number of products or business systems offered by SAP AG. Accordingly, the application server 221 may be implemented as an instance of a SAP™ NetWeaver™ Advanced Business Application Programming (ABAP) engine. The UI sessions 111 instantiated in the application server 221 may be implemented as instances of SAP GUI sessions, while the UI agents 110 may be implemented as instances of SAP GUI agents. In such embodiments, the UI agents 110 may be in communication with the UI sessions 111 over a UI connection 120, such as an SAP GUI connection. The SAP GUI connection may include an implementation of a dynamic information and action gateway (DIAG) protocol.

The DIAG protocol is a TCP/IP protocol implemented by SAP for facilitating communication between an SAP system, such as the NetWeaver™ ABAP engine, and a diverse selection of frontend components, such as SAP GUI for Windows or Java. As such, the UI connection 120 implemented to include the DIAG protocol may include support for dynpro messages and remote function call (RFC) messages. Dynpro is a message format delivers data that represents UIs or screens of data. For example, a dynpro message can define a particular screen that is displayed as a UI. RFCs are a type of message that supports synchronous and asynchronous communication between various systems (SAP and non-SAP) for requesting functions to be executed in a remote system.

To facilitate communication between the UI sessions 111, various embodiments of the present disclosure may use ABAP messaging channels (not shown). The ABAP messaging channels, or more generically, application messaging channels (AMC) include a method of communication between ABAP and non-ABAP programs instantiated in the application server using messages. Messages can be exchanged between any program, including communication among UI sessions 111 and other applications. While the SAP™ implementations of various components of the system 200 are possible, embodiments of the present disclosure are not limited to the offerings of SAP™. Accordingly, one of ordinary skill in the art will realize system 200 may include various types of client-server based centralized data management and storage systems that utilize application messaging channels (AMCs) for communication among the UI sessions 111 and other applications in the application server 221.

As shown, each UI agent 110 may communicate with its corresponding UI session 111, instantiated in the application server 221, over a corresponding UI connection 120. Because each client 210 may be operated by a separate user, the UI agents 110 may send a number of transaction/refresh requests to their associated UI sessions 111 in parallel. Each UI session 111 may then operate on common or different data sources in the data management and storage system 223. When the UI sessions 111 operate on the same data source, complications arise that may cause the information displayed by one or more of the UI agents 110 to be out of date. For example, as discussed above, one UI agent 110-1 may request its corresponding UI session 111-1 to execute a transaction to retrieve the current information (i.e., the amount of a particular invoice) stored in a particular data source so that it can be displayed in a corresponding UI on client computing device 210-1. Meanwhile another UI agent 110-3 may request that its UI session 111-3 execute a transaction to update, change, or delete the information (i.e., edit the amount of the invoice) in the same data source according to business transactions initiated by or observed by the user of the corresponding client computing device 210-3. At that time, the information displayed by the UI agents 110-1 will be out of date because it does not show the updated or deleted information in the data source as edited by the UI session 111-3.

Figure 3:
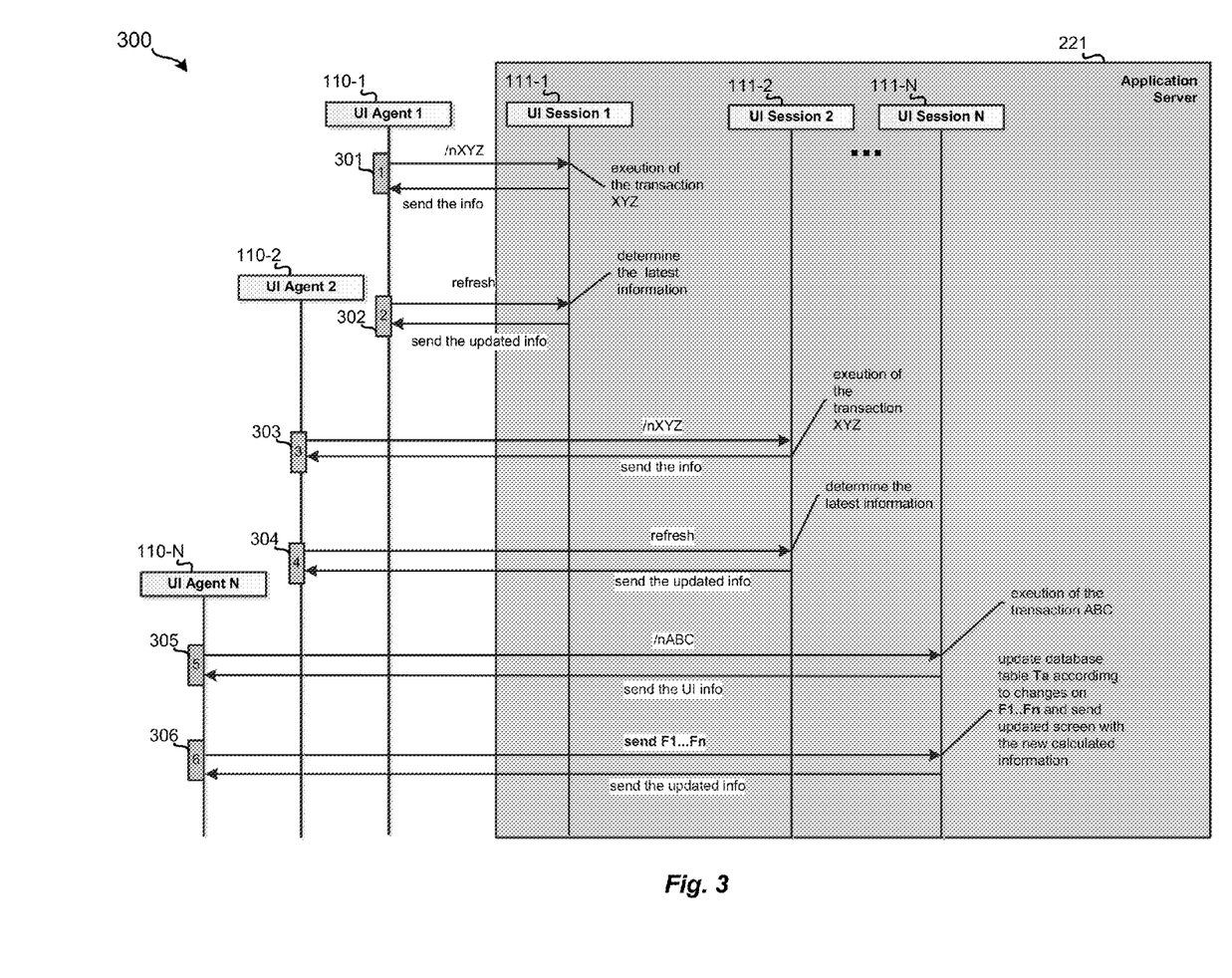
FIG. 3 illustrates a dataflow for displaying information from a central data source that may be improved by embodiments of the present disclosure.

Data Flows for Accessing Information in Centralized Data Storage and Management Systems FIG. 3 illustrates a data flow 300 typically used by multiple UI agents 110 and UI sessions 111 for providing up-to-date information in corresponding UIs that may cause negatively affect the performance of a given business system or centralized data management and storage system. In the specific example shown in FIG. 3, the data flow describes a number of transactions and responses between N corresponding UI agents 110 and UI sessions 111. In this context, N represents a natural number.

To retrieve the most up to date information in a particular data source, each one of the UI agents 110 would need to send a refresh request to the corresponding UI session 111 to update the previously requested information by re-executing the previously requested transaction. For example, at box 301, the UI agents 110-1 may send the transaction request ("/nXYZ") to its corresponding UI session 111-1. In response to the request, the UI session 111-1 can execute the transaction /nXYZ and return the resulting information to the UI agent 110-1. The UI agent 110-1 may then display the information in a corresponding UI. At some later time, represented here as box 302, the same UI agent 110-1 may send a refresh request to the corresponding UI session 111-1. In response to the refresh request, the UI session 111-1 may update the previously generated information and return it back to the UI agent 110-1 so that the UI may be updated.

Similarly, at box 303, UI agent 110-3 may send the transaction /nXYZ to the corresponding UI session 111-2. The UI session 111-2 may execute the transaction /nXYZ and return the resulting information to the UI agent 110-2. At a later time, at box 304, UI agent 110-2 may send a refresh request to UI session 111-2 to ensure that the information displayed in the UI is the most current information in the data source. In response to the refresh request, UI session 111-2 may send the updated information back to the UI agent 110-2. Such activity can occur for as many as N UI agent-UI session pairs that ultimately operate on a common data source. Accordingly, the UI agent 110-N, at box 305, may send a transaction /nABC to its corresponding UI session 111-N. In response, the UI session 111-N can send the UI content requested according to the transaction /nABC back to the UI agent 110-N.

As previously discussed, any of the UI agents 110 may initiate transactions that alter or edit the data in the underlying data source. For example, at box 306, the UI agent 110-N may send transactions or functions F1 . . . Fn to UI session 111-N for operation on various pieces of data stored in the data source from which UI sessions 111-1 and 111-2 from which previously populated. For example, the functions F1 . . . Fn may change fields 1 . . . n in a given database. Once the changes are made in the data source, the UI session 111-N may return the updated information based on the altered data back to the UI agent 110-N. If any of the data altered by the functions F1 . . . Fn affects the information in transaction /nXYZ, then the UI agents 110-1 and 110-2 would need to send refresh requests in order to update the information displayed in the corresponding UIs to represent the current information.

While the refresh requests may be initiated manually in response to a user input, (e.g., operation of a refresh button in the UI) or automatically (e.g., automatic refreshes executed periodically or in response to polls to the data source), there is no way for each individual user, UI agent 110 or UI session 111 to know when to the underlying data source has been changed. As a result, many refresh requests are initiated and executed when it is unnecessary (i.e., executed even when the underlying data source is unchanged). As such, it is clear that the unnecessary refresh requests can waste computing and communication resources at the client level and at the business system level. Such wasted computing and communication resources may negatively impact the performance of the centralized data storage and management systems 221. Embodiments of the present disclosure avoid such impacts on performance by avoiding unnecessary refreshes by only performing updates or refreshes when the application server 220, or other component determines that a transaction or function has been executed that may change the underlying data.

Systems for Accessing Current Information Using UI Push Channels

Figure 4:
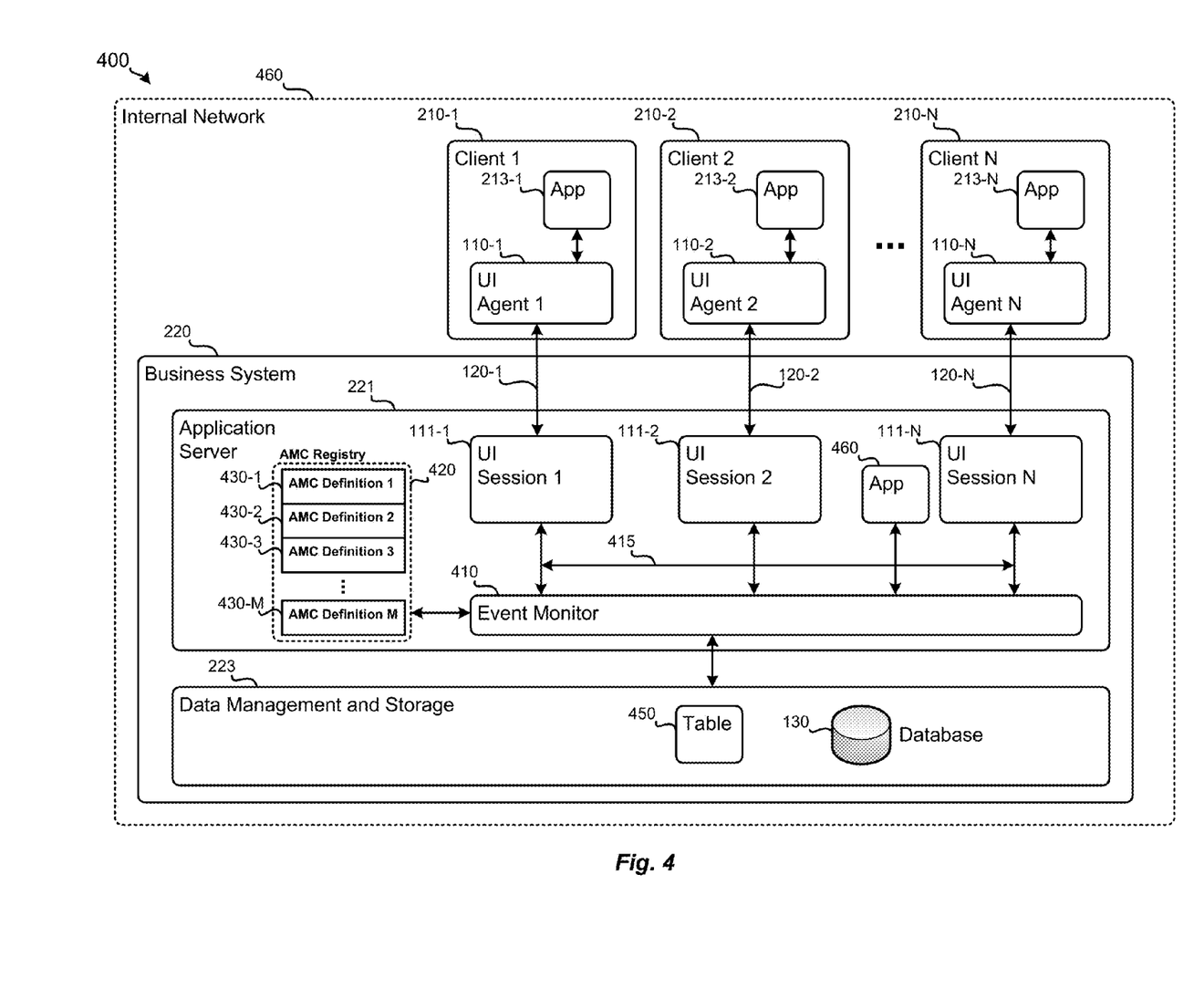
FIG. 4 illustrates an example system for a UI push channel according to one embodiment of the present disclosure.

FIG. 4 illustrates an improved system 400 for accessing information in a centralized data management and storage system 223 according to various embodiments of the present disclosure. In such embodiments, the application server 221 may include an instance of event monitor 410. The event monitor may communicate with the UI sessions 111 using one or more AMCs 415. By analyzing transactions, and other functions, from UI sessions 111 and applications 460 received through AMC 415, the event monitor 410 may determine when potential changes to information stored in the data management and storage system 223 might occur. For example, the event monitor 410 may analyze the transactions executed by UI sessions 11 for operations that add, delete, or modify the information in one or more data sources in the centralized data management and storage system 223, such as table 450 and database 130. The features and advantages of system 400 are discussed in more detail below.

As shown, the UI sessions 111 instantiated in the application server 221 (e.g., a NetWeaver™ ABAP Engine) can execute transactions on data sources in the data management and storage system 223 through the event monitor 410 and the AMCs 415. While the AMCs 415 are illustrated in FIG. 4 as a single common connection between the UI sessions 111, application 460 and the event monitor 410, it should be understood that the AMCs 415 may be implemented as specific communication channels between specific UI sessions 111, application 460, and the event monitor 410.

For example, one possible AMC may be dedicated to communication between UI session 111-1 and UI session 111-N, while another possible AMC may be dedicated to communication between UI session 111-2 and application 460. In addition, individual AMC paths may be created using an addressing protocol when executing transactions and sending messages over AMC 415. In particular, each message or transaction that a UI session 111 sends may include one or more identifiers to designate to which UI sessions 111, application 460, or data source the message or transaction should be delivered. For instance, UI session 111-2 may send a transaction to add information to table 450 and a message alerting UI session 111-N that a change will be made to the table 450. In such a scenario, UI session 111-2 may include an identifier associated with table 405 and an identifier associate with UI session 111-N in the transaction/message that it sends out on AMC 415 and/or event monitor 415.

In some embodiments, an AMC 415 may be predefined to communicate transactions/messages to and from specific subscribers or recipients. An AMC definition 430 may specify that the corresponding AMC 415 be dedicated to sending message from source UI session 111, also referred to herein in as a publisher, to one or more subscriber UI sessions 111, also referred to herein as a subscribers. Thus, any message that the publisher, such as UI session 111-2, sends out on the AMC 415 defined in the associated AMC definition 430-2 will be sent to the UI sessions 111-1 and UI session-N, as may be designated in the UI definition 430-2.

Similarly, an AMC definition 430 may also specify a subscriber data source on which transactions should operate when sent over the corresponding AMC 415. For instance, a UI session 111-1 may send an aggregation transaction over an AMC 415 defined in AMC definition 430-3 that designates database 130 as the target data source.

Accordingly, in some embodiments, each UI session 111 or application 460 may include an AMC identifier associated with an AMC definition 430 with each transaction or message that it sends. Based on the AMC definition 430, the transactions or messages may be routed over the desired AMC 415 to the desired UI session 111, application 460, or data source. The AMC definition 430 associated with the designated AMC identifier can be used by the application server 221, event monitor 410, or other element of the business system 220, to determine the specific AMC 415 one which a particular transaction or message was sent. For example, the event monitor 410 may use the AMC identifier associated with or included with a particular transaction to refer to the corresponding to AMC definition 430-M in order to detect which AMC 415 was used send the transaction and to which other entities may need to be informed of the transaction. For instance, AMC definition 430-M may indicate that UI session 111-2 and application 460 are subscribers to the corresponding AMC 415, and database 130 is the target data source.

In one example, a UI session 111-1 may be supporting a corresponding UI agent 110-1 in client computing device 210-1 (e.g., a desktop computer) used by a customer support representative that displays a UI that shows current shipping statuses based on information in shipment database 130. UI session 111-2 may support a UI agent 111-2 in a handheld mobile client computing device 110-2 (e.g., a handheld scanner) used by a delivery person for entering or updating the shipment statuses in the shipment database 130. When the UI session 111-2 receives a transaction request from the handheld mobile client computing device 110-2, it may send a transaction associated with an AMC identifier that corresponds to an AMC definition 430-2 that designates the shipment database 130 as the target data source, and UI session 111-1 as a subscriber. In accordance with the AMC definition 430-2, the event monitor 410 may send an event notification to the UI session 111-1 that the shipment status information in the shipment database 130 may have been changed. In response to the notification, the UI session 111-1 may re-execute or refresh the transaction that it uses to obtain the current shipment status shown in the corresponding UI.

As illustrated above, based on the AMC definitions 430 in the AMC registry 420 associated with the detected AMC identifiers, the event monitor 410, or other component of the application server 221, may broadcast a notification of a particular event over one or more AMCs 415 to one or more subscribers. In some embodiments, in addition to listing UI sessions 111 UI as subscriber, an AMC definition may also list connections 120, UI agents 110, or applications 460 as subscribers.

To determine over which AMC 415 and to which UI agents 110, UI connections 120, or UI sessions 111 to broadcast the notification of the event, the event monitor may first determine which UI agents 110, UI connections 120, or UI sessions 111 may be interested in receiving such notifications. To determine over which AMC 415 to broadcast the event notification, the event monitor 410 may analyze each transaction before, while, or after it is executed on the target data source. The analysis of the transaction may include detecting identifiers associated with the UI agent 110, UI session 111, or the corresponding UI connection. The event monitor 410 may then reference the AMC registry 420 to retrieve any AMC definitions 430 that are associated with the identifiers.

Referencing the AMC registry 420 may include accessing a number of AMC definitions 430. Accessing the AMC definitions 430 may be accomplished in a number of ways. In one embodiment, each AMC definition 430 may include a listing of publishers to the corresponding AMC 415. Similarly, each AMC definition 430 may include a listing of subscribers to the corresponding AMC 415. In addition, each AMC definition may also include a listing of target data sources and/or transaction types. For example, one of the AMC definitions 430-1 may define UI agent 110-1 or UI connection 120-1 as subscribers to the corresponding AMC 415. That same AMC definition 430-1 may also define UI session 111-2 and application 460 as publishers to the corresponding AMC 415. The AMC definition 430 may also define table 450 as the target data source of concern. Accordingly, any time UI session 111-2 or application 460 executes a transaction on table 450, the event monitor 410 may determine, based on the AMC definition 430-1, to broadcast a notification to UI agent 110-1 or UI connection 120-1 over the corresponding AMC 415.

In some embodiments, the types of transactions that trigger the event monitor 410 to reference the AMC registry 420 to determine a number of AMCs over which to broadcast one or more notifications can be defined at the individual AMC definition 430 level or at the global level. Accordingly, in embodiments in which the transaction type that triggers the event monitor 410 to reference the AMC registry 420 is a global setting, all transactions that cause information in one or more target data sources in the data management and storage system 223 to change (e.g., updates, deletions, additions, and the like) will trigger the event monitor 410 to send out event notifications according to the AMC definitions 430 in the AMC registry 420. In such embodiments, any transactions that do not alter the underlying data in the target data source may not trigger the event monitor 400 to search for an appropriate AMC over which to broadcast the event notification. Alternatively, every transaction or event may trigger the event monitor 410 to reference the AMC registry 420 to determine an appropriate AMC over which to broadcast a notification of the transaction or other event.

In one embodiment, to accurately reference the AMC definitions 430 in the AMC registry 420, the event monitor 410 may detect certain attributes of the functions or transactions. In some embodiments, the transactions or functions executed through the event monitor 410 may include information regarding the target data source, the type of functions to be executed on that data source, as well as the originating UI agent 110, UI connection 120, and UI session 111. For example, when the UI session 111 executes an information request transaction on a data source in the data management and storage system 223 through the event monitor 410, the event monitor 410 may determine identifiers associated with the UI agent 110, the UI connection 120 and/or the UI session 111 from which the transaction was initiated or executed. Based on the information determined from the transaction, the event monitor 410 may reference the AMC registry 420 to determine a number of applicable AMC definitions 430. Using the identifiers determined from the executed transaction, the event monitor 410 may access the appropriate AMC definitions 430 and then use them for determining the appropriate AMCs 415 over which to broadcast any potential event notifications.

When a potentially interested component, such as a UI agent 110, UI connection 120, or UI session 111 receives an event notification from the event monitor 410, it may determine individually what to do with or in response to the notification. In some embodiments, the UI agent 110 may first determine whether the prescribed action in response to the event notification may be performed by the UA agent 110 itself or needs to be processed by the UI session 111. For example, a response to an event notification that a UI agent may handle on its own it to display a flag or other alert that the information on the screen is no longer current. In some embodiments, the event notification may require that the client computing device 210 launch a local application 213. In such situations, the UI agent 110 may initiate the launch of the application 213 on its own. In contrast, however, the UI agent 110 may determine that the prescribed action in response to the event notification may only be executed by its associated UI session 111 in the application server 221. For example, the UI agent 110 may determine that the prescribed response to the event notification is to execute another transaction (e.g., a refresh transaction) on a data source in the data management and storage system 223. In such scenarios, the UI agent 110 would require that UI session 111 executes the transaction on its behalf and return the resulting information.

In the specific example shown in FIG. 4, business system 400 is depicted as a client-server implementation within an internal network 460. As such, each client computing device 210 may communicate with the business system 220 using one or more standardized or proprietary secure communication protocols or media. In addition, each client computing device 210 may require a user to enter user authentication credentials (e.g. a username and password pair) before he or she is allowed to access information within the internal network 460. While internal network 460 is depicted as a contained secure network in which client computing devices 210 and the business system 220 are all connected to a common secure networking environment, various embodiments of the present disclosure may also include scenarios in which some of the client computing devices 210 are external to the internal network 460. In such embodiments, client computing devices 210 may communicate with the internal network 460 through one or more intermediate networks (e.g., the Internet) using a secure networking protocol (e.g., a virtual private network (VPN)).

Application Messaging Channel Definitions

Figure 5:
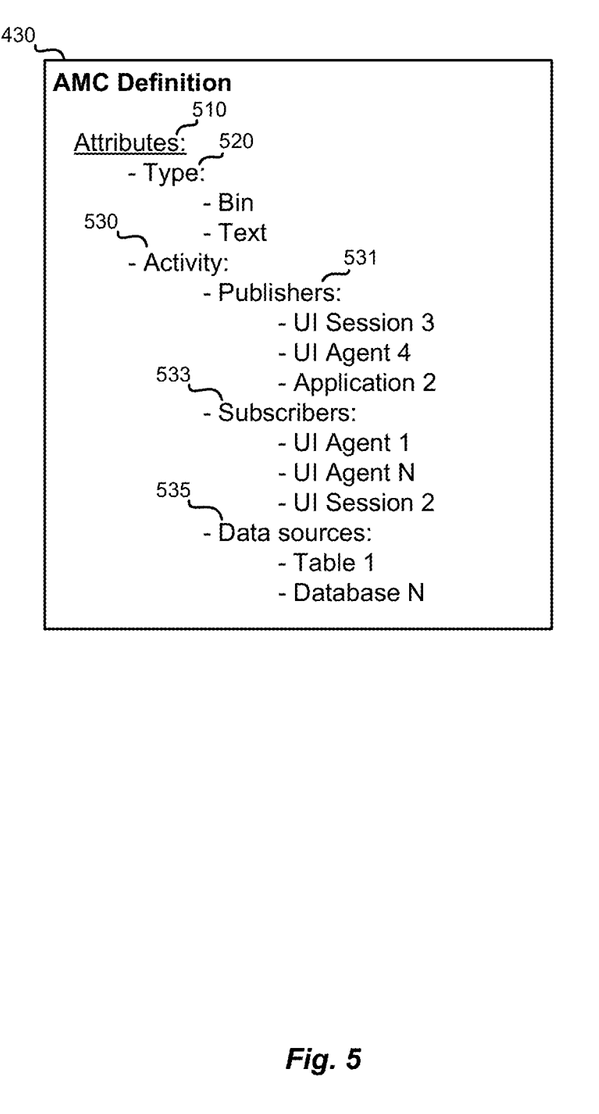
FIG. 5 illustrates an example application messaging channel (AMC) definition according to one embodiment of the present disclosure.

FIG. 5 depicts a particular example of an AMC definition 430. In some embodiments, the AMC definition 430 may include a number of attributes 510 that may be used by the event monitor 410, or other component of the business system 220, to identify the AMC definition 430 and determine the corresponding AMC 415. For example, the attributes 510 may include the type of message 520 that may be broadcast over the particular AMC 415. In this particular example, both binary and text messages may be broadcast over the AMC 415 associated with the AMC definition 430. In addition to the type of message 520 that may be sent over the AMC 415, the AMC definition 430 may also include the activities 530 that might trigger an event notification to be broadcast over the AMC 415. In the particular example shown, the activities 530 include listings of publishers 531, subscribers 533, and data sources 535. For example, any transactions executed by UI sessions 3, UI agent 4, and application 2 that operate on data sources 535 table 1 and database N will trigger an event notification to be sent to subscribers UI agent 1, UI connection N, and UI session 2. While not shown, the AMC definition 430 may also define the types of transactions for each data source 449 that would trigger an event notification to be broadcast on the AMC 415. For example, the AMC definition 430 may specify that only transactions that change the target data sources 535, such as a write, edit, or delete transactions, will trigger an event notification to be broadcast over the AMC 415.

The collection of attributes 510 in an AMC definition 430 may define a number of connections or paths between the publishers 533 and the subscriber 535 via their respective UI connections 120 (e.g., DIAG connections) and the associated AMC 415 to which they are bound. Because notifications of transactions initiated or completed through UI connections 120 associated with of the publishers 531 can be pushed to the subscribers 533 over their respective UI connections 120 and the AMC 415, the connections or paths established are referred to herein as UI push channels. Accordingly, a UI push channel may be defined as the association between the UI connection 120 of a publisher 531, the AMC 415, and the UI connection 120 of a subscriber 533. A UI push channel may thus become a channel over which notifications of transactions or functions that may potentially alter the underlying data sources 535 may be pushed to subscriber UI agents 110, UI sessions 111 or UI connections 120.

In some embodiments, the UI push channel can be implemented as an extension of the DIAG protocol. The DIAG protocol can be extended to include messages and pathways that are defined by the specifications of a particular AMC definition 430.

UI Push Channels

Figure 6:
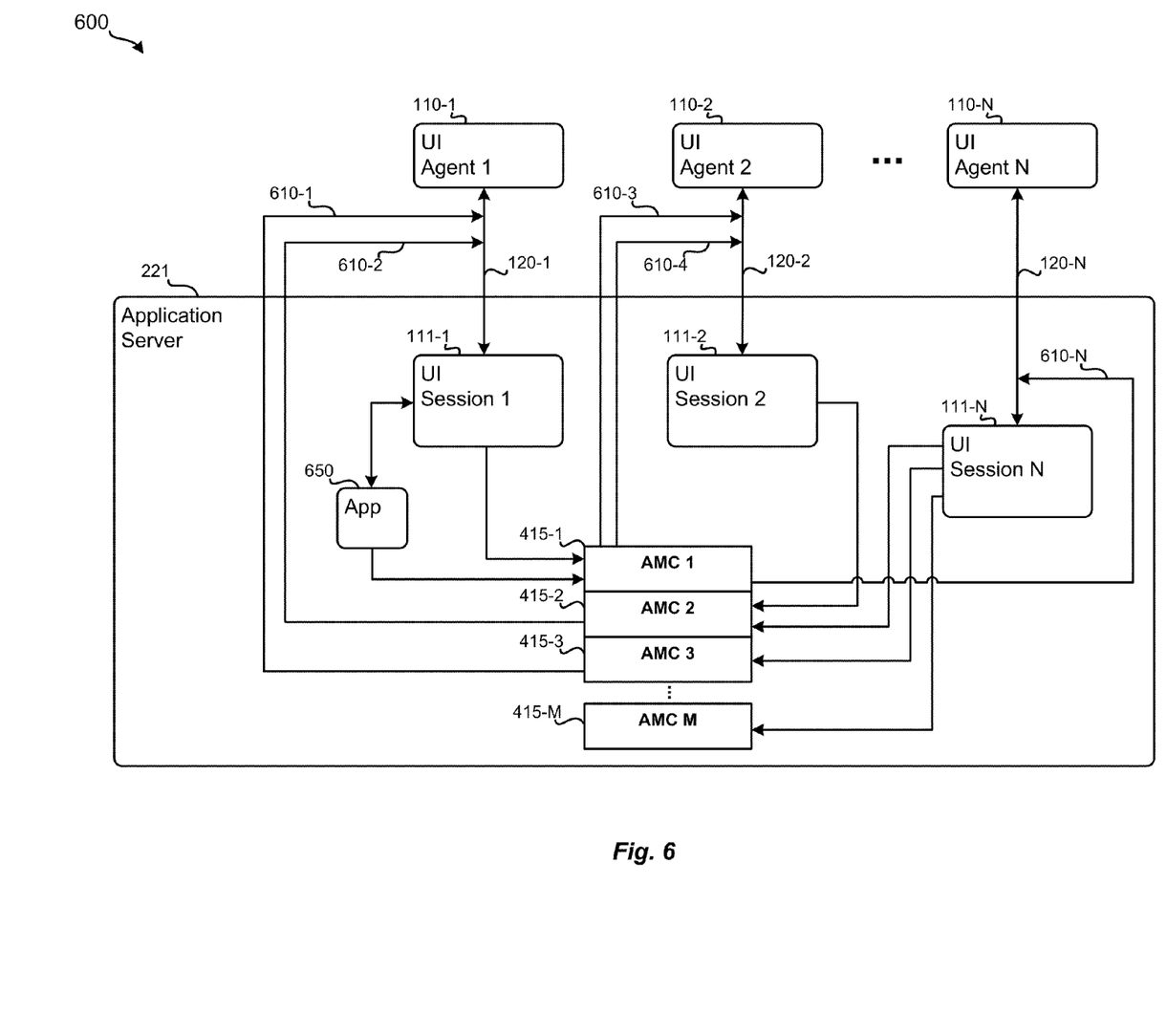
FIG. 6 illustrates an example system of UI push channels according to one embodiment of the present disclosure.

FIG. 6 is a schematic of an example system 600 with UI push channels 610 for delivering event notifications to one or more UI agents 110, UI session 111, or UI connections 120, as defined by a particular set of AMC definitions 430 in an AMC registry 420. In the example shown in FIG. 6, the UI push channels 610 include connections from various UI sessions 111 through AMCs 415 to the UI connections 120 defined in the corresponding AMC definition 430 or AMC registry 420. For instance, the AMC definition 430 for AMC 415-1 may define UI session 111-1 and application 650 as publishers. Any time either one of UI session 111-1 or application 650 perform a transaction on a specified data source, an event notification may be broadcast over AMC 415-1 to the UI connection 120-N, thus creating UI push channel 610-N. Similarly, the AMC definition for AMC 415-2 may define UI sessions 111-2 and 111-N as publishers such that any transactions that UI sessions 111-2 and 111-N execute that change the data in the specified data sources trigger an event notification. Accordingly, AMC 415-2 can be used to broadcast event notifications to the UI connection 120-1, thus creating UI push channel 610-2. As another example, the AMC definition associated with the AMC 415-3 may define UI session 111-N as a producer. The AMC definition for AMC 415-3 may also specify that any transactions executed by UI session 111-N on any data source will trigger an event notification to be broadcast to the UI connection 120-1 over AMC 415-3, thus creating the UI push channel 610-1. Once the event notification is broadcast over the corresponding UI push channel 610, either the UI agent 110 or the UI session 111 can take action in response to the event notification.

Data Flows for UI Push Channels

Figure 7:
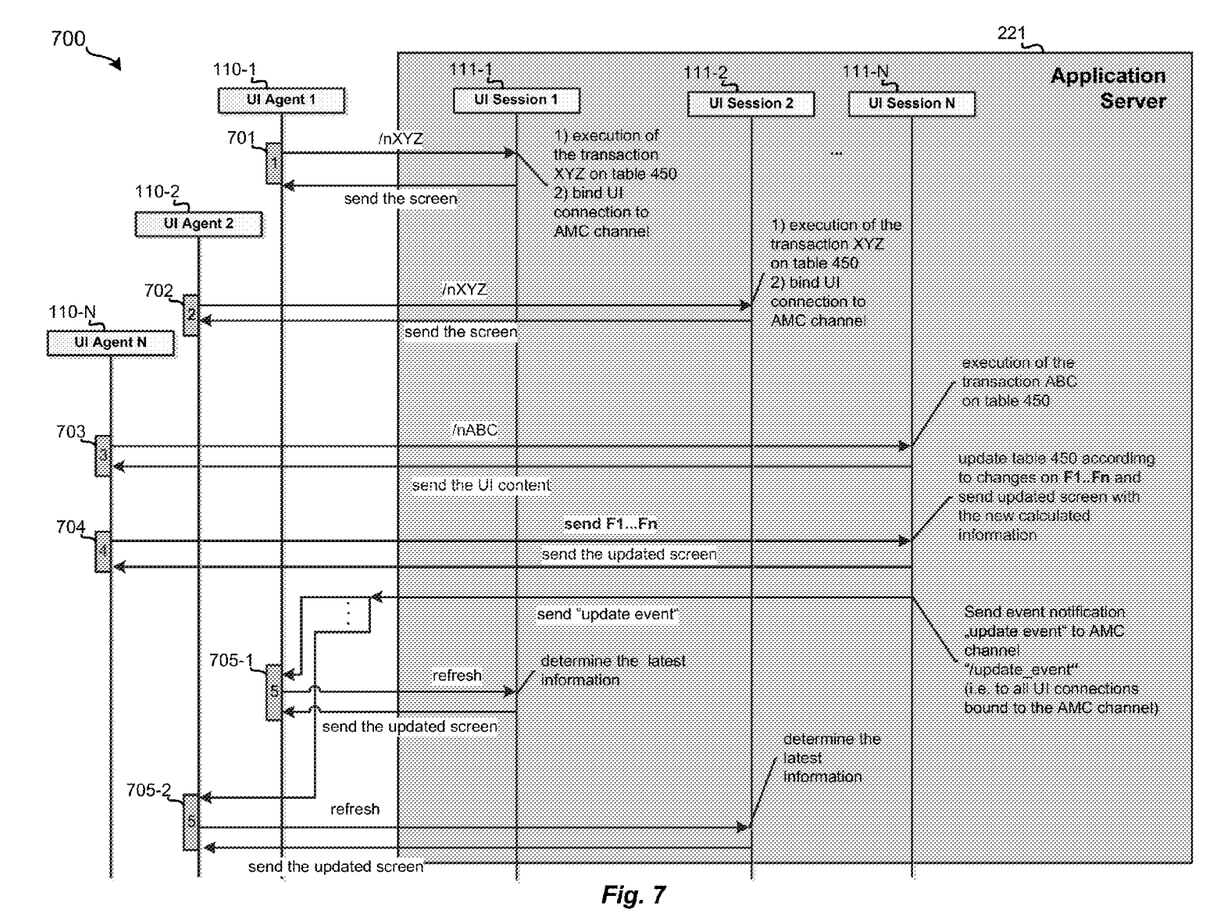
FIG. 7 illustrates an example dataflow for establishing and using UI push channels according to various embodiments of the present disclosure.

FIG. 7 is a data flow 700 for defining UI push channels and broadcasting event notifications over those UI push channels, according to an embodiment of the present invention. The data flow 700 may begin with a UI agent 110-1 sending a request for a transaction /nXYZ (e.g., read data from a particular data source) to its corresponding UI session 111-1 in the application server 221 through the corresponding UI connection 120-1, at box 701. In response to the request for transaction /nXYZ, the UI session 111-1 may execute a transaction data source such as table 450 through the event monitor 410.

In some embodiments, the event monitor 410, or some other component of the application server 221, may bind the UI connection 120-1 to a particular AMC 415. The AMC 415 to which the UI connection 120-1 is bound may be determined based on an identifier associated with the UI agent 110-1, the UI connection 120-1, the UI session 111-1, or the table 450. In some embodiments, the process by which the UI connection 120-1 is bound to a particular AMC 415 may include registering the UI agent 110-1, the UI connection 120-1, or the UI session 111-1 as a subscriber to that particular AMC 415. Accordingly, an AMC 415 may be dedicated to broadcasting event notifications regarding a particular data source, such as table 450. Any element that issues transactions that alter table 450 may be the registered as a publisher in the respective AMC definition 430. Similarly, any element that receives information from the table 450 for displaying the particular UI may be registered as a subscriber in the respective AMC definition 430.

To continue the example above, the UI agent 110-2, at box 702, may issue transaction /nXYZ to its corresponding UI session 111-2 over UI connection 120-2. In response to the transaction /nXYZ, the UI session 111-2 may execute the transaction /nXYZ on the table 450 through the event monitor 410. Before, during, or after the transaction /nXYZ is executed, the event monitor 410, or another component of the application server 221, may bind UI connection 120-2 to the AMC associated with the table 450. Accordingly, the UI connection 120-2 may also be registered in the corresponding AMC definition 430 as a subscriber.

As many as N UI agents 110, UI connections 120, and UI sessions 111 may be associated with a particular AMC definition 430 as publishers or subscribers. Accordingly, as illustrated in FIG. 7, a UI agent 110-N, box 703, can send a request for the execution of transaction /nABC to its corresponding UI session 111-N through UI connection 111-N. As before, the UI session 111-N may execute the transaction /nABC on the table 450 through the event monitor 410 and the UI agent 110-N, the UI connection 120-N, and/or the UI session 111-N may be bound to the AMC associated with the table 450. At a later time, represented here at box 704, UI agent 110-N can send a request to execute a number of field updates (e.g., F1 . . . Fn) to the UI session 111-N to update or change in number of fields in the table 450. As with other transactions, the UI session 111-N may execute the field updates through the event monitor 410. Based on analysis of the field updates, the event monitor 410 may note that the requested transactions will make changes to the table 450. Accordingly, the event monitor 410 may refer to the AMC registry 420 to identify one or more AMC definitions 430 associated with UI agent 110-N, the UI connection 120-N, the UI session 110-N, and/or the target table 450. In the present example, the event monitor 410 may retrieve the AMC definition 430 associated with the table 450, and in accordance therewith, send an event notification (e.g., /update_event) to all of the UI connections 120 bound to corresponding AMC 415.

UI connections 120-1 and 120-2 may receive the event notification through the corresponding AMC 415 defined by the AMC definition 430. Because the event notification may be sent to the UI connections 120-1 and 120-2, the event notification may be handled by either the corresponding UI agents 110 or UI sessions 111. In the specific example shown, the UI agents 110-1 and 110-2 receive the event notification boxes 705-1 and 705-2. In response to the event notification, the UI agents 110-1 and 110-2 they send a refresh request to the corresponding UI sessions 111. In response, the UI sessions 111 may send the updated information to be displayed in the corresponding UIs.

Figure 8:
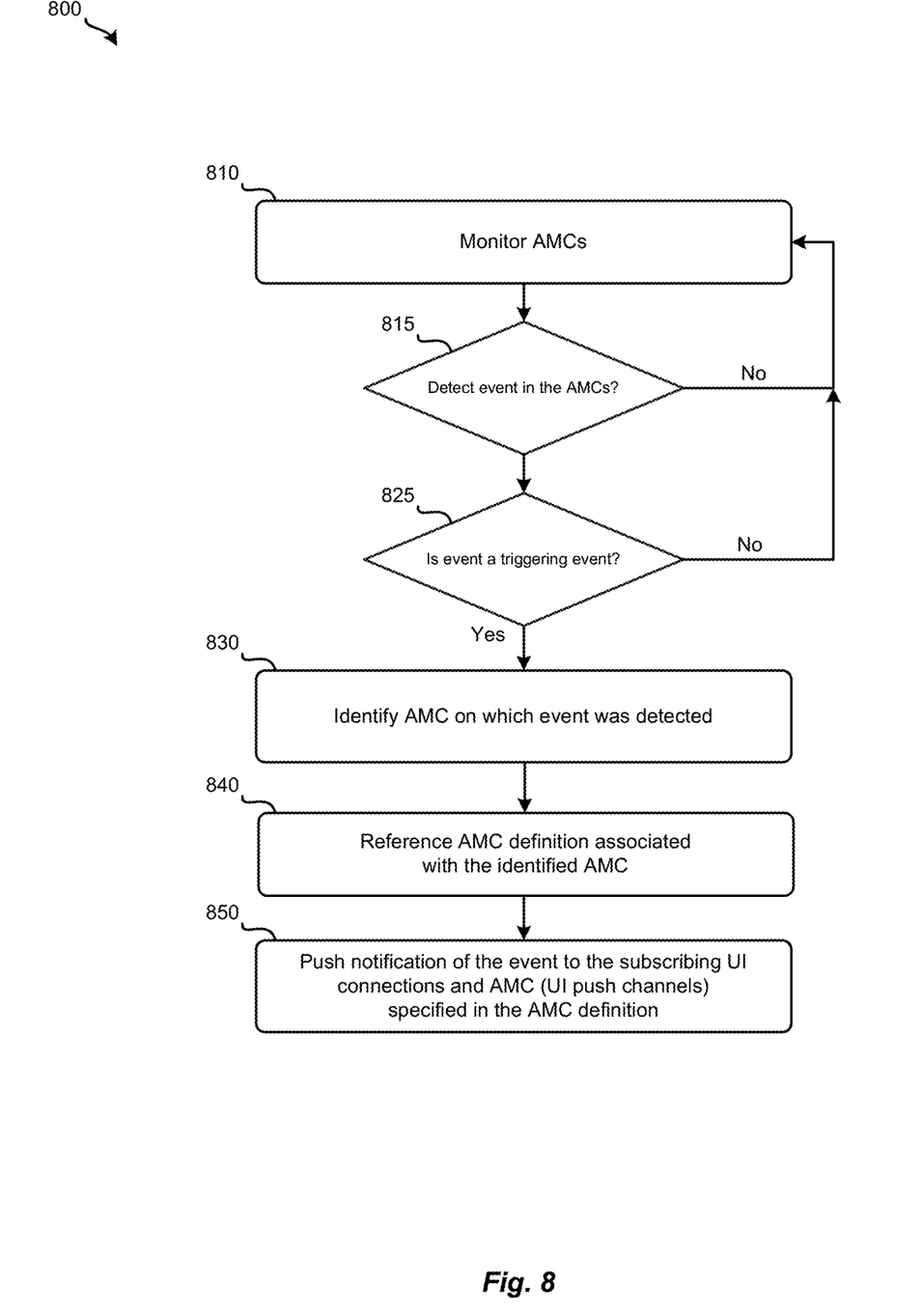
FIG. 8 is a method for sending event notifications over UI push channels according to one embodiment of the present disclosure.

FIG. 8 is a flowchart of a method 804 pushing event notifications to one or more UI agents 110, UI connections 120, and or UI sessions 111, according to various embodiments the present disclosure. The method 800 may begin at 810, in which the application server, or a component therein, such as the event monitor 410, may monitor one or more application messaging channels, or AMCs 415, established among various UI sessions and other applications within the application server. As used herein, the term AMC is used herein to refer to any communication link with a protocol that supports communication between applications instantiated in the application server 221. In addition, an AMC 415 may facilitate communication between the UI session 111 and a data management and storage system 223. In one embodiment, the AMC 415 may include the ABAP communication channel protocol from SAP™ AG.

The application server 221 may continue to monitor the AMC 415 until an event is detected in determination 815. In one embodiment, a detected event may include a transaction executed by a UI session 111 on one or more data sources, such as database 130. In determination 825, the application server 221 may determine whether or not the detected event is a triggering event. If the event is not a triggering event, then the application server 221 may continue to monitor the AMCs 415. A triggering event may include detecting a transaction operated on a data source that causes the data in the data source to be altered or changed in some way. For example, a transaction that updates or changes a number of fields in the table 450 may qualify as a triggering event. Similarly, a transaction that deletes records in a database 130 may also qualify as a triggering event. In general, any transaction that changes the underlying data in a data source accessed by a particular UI agent 110 and or UI session 111 may qualify as a triggering event, such that a corresponding UI displayed on one or more client computing devices 210 may need to be updated in response to the changes in the underlying data.

If the event is a triggering event, then the application server 221 may continue to action 830 to identify the AMC 415 on which the event was detected. In some embodiments, identifying the AMC 415 may include identifying and identifier associated with the AMC 415 over which a triggering event was detected.

In other embodiments, identifying the AMC 415 may include referencing an AMC registry 420 to retrieve an associated AMC definition 430, in action 840. In one embodiment, the event monitor 410 may retrieve the AMC definition 430 based on a data source identifier. The data source identifier may include some unique identification for designating a particular table, database or other data structure, such as a file directory address, Internet address, URL, filename, or the like. Alternatively, an AMC definition 430 may be retrieved based on an identifier associated with the originating UI agent 110, UI connection 120, or UI session 111. For example, an AMC definition 430 may be retrieved based on an identifier associated with a UI session 111. The corresponding AMC definition 430 may list the identifier associated with the originating UI session 111 as a publisher to that AMC 415.

Once the application server 221 retrieves the appropriate corresponding AMC definition 430 from the AMC registry 420, it may broadcast the event notification to one or more subscribers listed in the AMC definition 430. As described herein, a subscriber defined in the AMC definition 430 may include a UI agent 110, a UI connection 120, application 460, or UI session 111. In embodiments in which multiple UI connections 120 are defined as subscribers, the path from the UI session 111 that executed the triggering event through the AMC 415 associated with the AMC definition 420 to the UI connection 120 is referred to herein as a UI push channel 610. Accordingly, any event notifications required by the AMC definitions 430 may be pushed to the corresponding subscribers through the UI push channel 610, in action 850.

Figure 9:
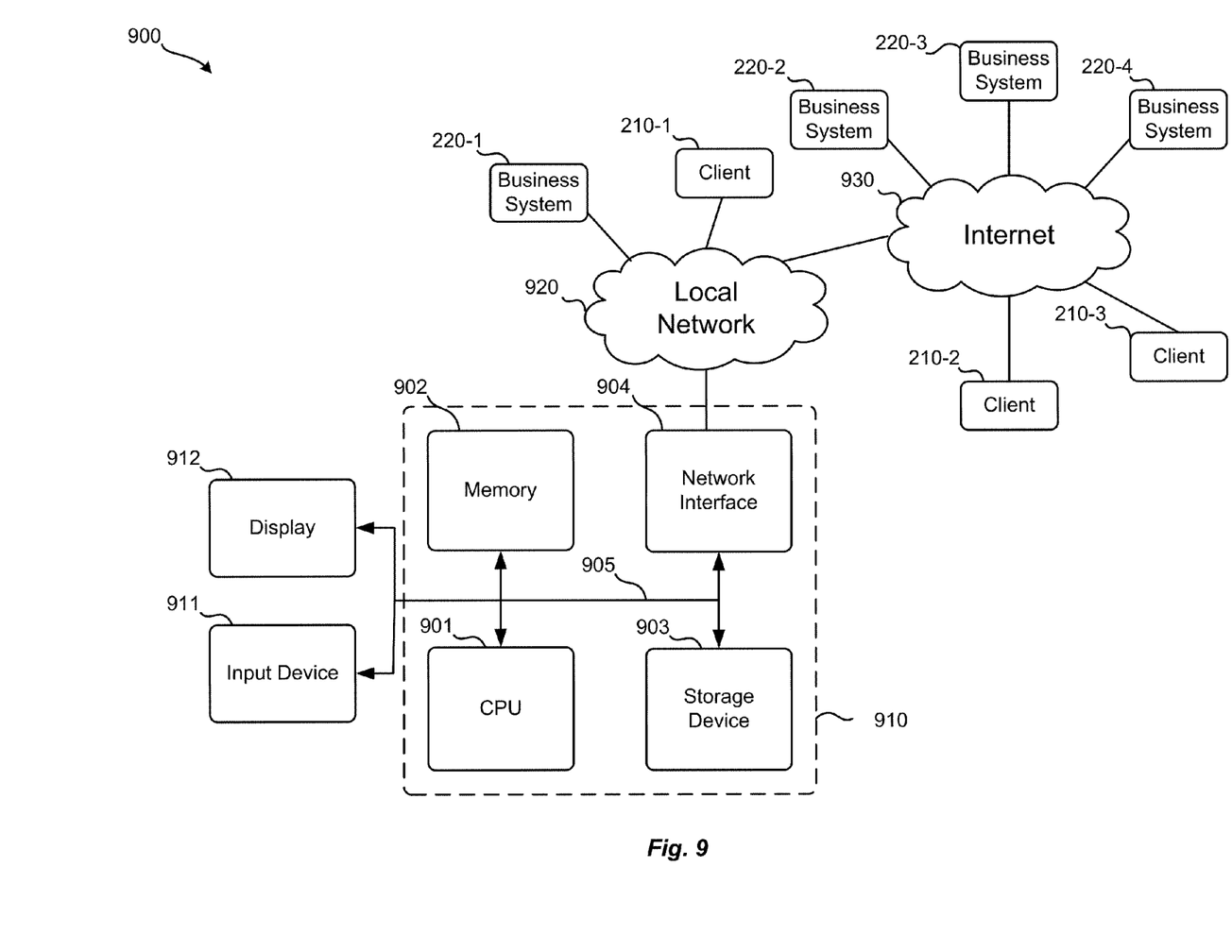
FIG. 9 illustrates an example computer system and network of client computing and business system that may be used to implement various embodiments of the present disclosure.

FIG. 9 illustrates an example computer system and networks that may be used to implement embodiments of the present disclosure. Computer system 910 includes a bus 905 or other communication mechanism for communicating information, and a processor 901 coupled with bus 905 for processing information. Computer system 910 also includes a memory 902 coupled to bus 905 for storing information and instructions to be executed by processor 901, including instructions for performing the techniques described above. This memory may also be used for storing temporary variables or other intermediate information during execution of instructions to be executed by processor 901. Possible implementations of this memory may be, but are not limited to, random access memory (RAM), read only memory (ROM), or both. A storage device 903 is also provided for storing information and instructions. The information instructions can be in the form of computer readable code stored on the storage device, accessible and executable by processor to implement various techniques and methods of the present disclosure. Common forms of storage devices include non-transitory, non-volatile computer readable media, for example, a hard drive, a magnetic disk, an optical disk, a CD, a DVD, a flash memory, a USB memory card, or any other medium from which a computer can read.

Computer system 910 may be coupled via the same or different information bus, such as bus 905, to a display 912, touchscreen, or liquid crystal display (LCD), for displaying information. An input device 911 such as a keyboard, touchscreen, and/or mouse is coupled to a bus for communicating information and command selections from the user to processor 901. The combination of these components allows the user to communicate with the system. In some embodiments, the display 912 and the input device 911 may be implemented in a single device, such as a touchscreen.

Computer system 910 also includes a network interface 904 coupled with bus 905. Network interface 904 may provide two-way data communication between computer system 910 and the local network 920. The network interface 904 may be a local area network (LAN) card to provide a data communication connection to a compatible LAN. The LAN card may include a wireless LAN (WLAN) card for communicating with a corresponding wireless network. In any such implementation, network interface 1004 sends and receives electrical, electromagnetic, or optical signals that carry digital data streams representing various types of information.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
instantiating, in an application server of a computer system,
a first user interface (UI) session in communication through a first UI connection with a corresponding first UI agent instantiated in a first client computing device and
a second UI session in communication through a second UI connection with a corresponding second UI agent instantiated in a second client computing device,
wherein the first UI session
handles transactions for information from a data source for the first UI agent to display on the first client computing device a first UI comprising the information from the data source,
wherein the second UI session
handles transactions for information from the data source for the second UI agent to display on the second client computing device a second UI comprising the information from the data source;
associating, in the computer system, the first and second UI connections with an application messaging channel (AMC), the AMC comprising an interface for communicating between the first UI session and the second UI session,
wherein associating the first UI connection with the AMC comprises
storing a UI connection identifier for the UI connection and an AMC identifier for the AMC in an AMC registry comprising a plurality of AMC definitions,
wherein each AMC definition in the plurality of AMC definitions comprises an AMC identifier associated with at least one UI connection identifier or a corresponding UI agent identifier;
receiving, in the computer system, on the AMC a notification of an event in the data source from the second UI session, wherein the event is caused by the second UI agent in the second client computing device; and
sending the notification of the event from the computer system to the first UI agent through the first UI connection.

2. The method of claim 1 further comprising:
receiving, by the first UI session, an update request from the first UI agent for updated information in response to the notification of the event;
processing, by the first UI session, the update request to generate the updated information from the data source; and
sending, by the first UI session, the updated information to first UI agent.

3. The method of claim 1, wherein sending the notification of the event comprises referencing the AMC definition in the AMC registry associated with the AMC identifier of the AMC on which the notification of the event was received to determine one or more subscriber UI connections or one or more subscriber UI agents to which the notification of the event is to be published.

4. The method of claim 3, wherein sending the notification of the event further comprises forwarding the notification to each of the subscriber UI connections or subscriber UI agents.

5. The method of claim 1, wherein the AMC comprises an advanced business programming (ABAP) messaging channel.

6. The method of claim 1 further comprising:
instantiating a third UI session in communication through a third UI connection with a corresponding third UI agent instantiated in a third client computing device,
wherein the third UI session handles transactions for information from the data source for the third UI agent to display on the third client computing device a third UI comprising the information from the data source; and
sending the notification of the event from the computer system to the third UI agent through the third UI connection.

7. A non-transitory computer readable medium comprising instructions that when executed by a computer processor cause the computer processor to:
instantiate, in an application server,
a first user interface (UI) session in communication through a first UI connection with a corresponding first UI agent instantiated in a first client computing device and
a second UI session in communication through a second UI connection with a corresponding second UI agent instantiated in a second client computing device,
wherein the first UI session
handles transactions for information from a data source for the first UI agent to display on the first client computing device a first UI comprising the information from the data source,
wherein the second UI session handles
transactions for information from the data source for the second UI agent to display on the second client computing device a second UI comprising the information from the data source;
associate the first and second UI connections with an application messaging channel (AMC), the AMC comprising an interface for communicating between the first UI session and the second UI session,
wherein associating the first UI connection with the AMC comprises
storing a UI connection identifier for the UI connection and an AMC identifier for the AMC in an AMC registry comprising a plurality of AMC definitions, wherein each AMC definition in the plurality of AMC definitions comprises an AMC identifier associated with at least one UI connection identifier or a corresponding UI agent identifier;
receive on the AMC a notification of an event in the data source from the second UI session,
wherein the event is caused by the second UI agent in the second client computing device; and
send the notification of the event to the first UI agent through the first UI connection.

8. The non-transitory computer readable medium of claim 7, wherein the instructions further cause the computer processor to:
receive, by the first UI session, an update request from the first UI agent for updated information in response to the notification of the event;
processes, by the first UI session, the update request to generate the updated information from the data source; and
send, by the first UI session, the updated information to first UI agent.

9. The non-transitory computer readable medium of claim 7, wherein sending the notification of the event comprises referencing the AMC definition in the AMC registry associated with the AMC identifier of the AMC on which the notification of the event was received to determine one or more subscriber UI connections or one or more subscriber UI agents to which the notification of the event is to be published.

10. The non-transitory computer readable medium of claim 9, wherein sending the notification of the event further comprises forwarding the notification to each of the subscriber UI connections or subscriber UI agents.

11. The non-transitory computer readable medium of claim 7, wherein the AMC comprises an advanced business programming (ABAP) messaging channel.

12. The non-transitory computer readable medium of claim 7, wherein the instructions further cause the computer processor to:
instantiate a third UI session in communication through a third UI connection with a corresponding third UI agent instantiated in a third client computing device,
wherein the third UI session handles transactions for information from the data source for the third UI agent to display on the third client computing device a third UI comprising the information from the data source; and
send the notification of the event from the computer system to the third UI agent through the third UI connection.

13. A system comprising:
a computer processor; and
a non-transitory computer readable medium coupled to the computer processor and comprising instructions that when executed by the computer processor causes the computer processor to:
instantiate, in an application server,
a first user interface (UI) session in communication through a first UI connection with a corresponding first UI agent instantiated in a first client computing device and
a second UI session in communication through a second UI connection with a corresponding second UI agent instantiated in a second client computing device,
wherein the first UI session handles
transactions for information from a data source for the first UI agent to display on the first client computing device a first UI comprising the information from the data source,
wherein the second UI session handles
transactions for information from the data source for the second UI agent to display on the second client computing device a second UI comprising the information from the data source;

associate the first and second UI connections with an application messaging channel (AMC), the AMC comprising an interface for communicating between the first UI session and the second UI session, wherein associating the first UI connection with the AMC comprises storing a UI connection identifier for the UI connection and an AMC identifier for the AMC in an AMC registry comprising a plurality of AMC definitions, wherein each AMC definition in the plurality of AMC definitions comprises an AMC identifier associated with at least one UI connection identifier or a corresponding UI agent identifier;

receive on the AMC a notification of an event in the data source from the second UI session, wherein the event is caused by the second UI agent in the second client computing device; and send the notification of the event to the first UI agent through the first UI connection.

14. The system of claim 13, wherein the instructions further cause the computer processor to:

receive an update request from the first UI agent for updated information in response to the notification of the event;

process the update request to generate the updated information from the data source; and send the updated information to first UI agent.

15. The system of claim 13, wherein sending the notification of the event comprises referencing the AMC definition in the AMC registry associated with the AMC identifier of the AMC on which the notification of the event was received to determine one or more subscriber UI connections or one or more subscriber UI agents to which the notification of the event is to be published.

16. The system of claim 15, wherein sending the notification of the event further comprises forwarding the notification to each of the subscriber UI connections or subscriber UI agents.

17. The system of claim 13, wherein the AMC comprises an advanced business programming (ABAP) messaging channel.

* * * * *